Oct. 23, 1956          W. E. CURRIE          2,768,009

COUPLING WITH RECESS FOR END OF FLEXIBLE PIPE

Filed Jan. 23, 1953

INVENTOR.
WILLIAM E. CURRIE
BY John N. Wolfram
Attorney

United States Patent Office 2,768,009
Patented Oct. 23, 1956

2,768,009

COUPLING WITH RECESS FOR END OF FLEXIBLE PIPE

William E. Currie, Cleveland, Ohio, assignor to The Parker Appliance Company, Cleveland, Ohio, a corporation of Ohio Application January 23, 1953, Serial No. 332,901

1 Claim. (Cl. 285—251)

This invention relates to hose couplings of the reusable type in which a socket is assembled over the end of the hose and a nipple is then attached to the socket and during attachment enters the hose end and compresses the same within the socket, and is particularly concerned with hose couplings of this type in which the socket has a ribbed clamping section terminating in a recess for receiving the extreme end of the hose, and which also has a transverse wall for limiting the distance to which the hose may be initially inserted into the socket. The hose end may be either the same diameter as the remainder of the hose or it may be a reduced diameter. When high pressure hose having a wire braid reenforcement between inner and outer layers of rubber is used, it is usually advantageous to remove the outer layer at the end of the hose so that the socket ribs may grip directly on the wire.

In hose couplings such as described above, the ribs in the clamping section of the socket are usually spiral so that initial assembly of the socket on the hose may be easily accomplished by simply threading the parts together. The spiral rib runs completely through the recess and hence the rib adjacent the recess feathers off from a full thread form to nothing.

The smallest diameter of the ribs may be about the same as the initial diameter of the clamped section of the hose or it may be somewhat smaller so that the hose end will be decreased thereby when it is initially inserted into the socket. The recess is larger than the initial diameter of the inserted hose end and permits the portion of the hose end which enters the recess to assume substantially its original or normal diameter. This allows a tapered nipple having its extremity of substantially the same outside diameter as the normal inside diameter of the hose to readily start into the hose. Upon further insertion of the nipple the end of the hose is expanded by the tapered portion to press it against the ribbed clamping section with great force for sealing the hose against the nipple and for gripping the hose end to prevent its withdrawal from the socket. The nipple is preferably attached to the socket by threading.

Because of the great force with which the hose end must be compressed to establish a seal and to provide sufficient grip against pulling, there is a strong tendency for the hose material to displace or extrude from the clamping area. The farther it can extrude, the more followup movement of the tapered nipple will be required to apply and maintain the required force. Also, displaced hose material may work itself into the threaded or other means of attachment of the nipple to the socket and interfere therewith. There is also a tendency for the hose to be pushed longitudinally of the socket in a direction for expelling it from the socket.

It is an object of the present invention to provide a coupling of the type described in which there will be a minimum of space adjacent the holding edges in the region of greatest clamping force into which hose material may be displaced or extruded.

It is another object to provide a hose coupling of the type described in which the recess in the socket provides an annular shoulder for gripping the hose end and wherein such shoulder is substantially uninterrupted by the spiral rib.

It is another object to provide a hose coupling comprising a nipple and socket attachable to each other wherein a stop shoulder is provided on the socket for the initial insertion of the hose, and wherein there is a bore beyond the stop shoulder for receiving hose material which may be displaced during assembly of the nipple to the socket.

It is another object to provide a nipple and socket wherein the socket has a recess inwardly of the clamping area for receiving the extreme end of the hose without constricting the diameter of the same whereby the nipple may freely start within the hose end and wherein there is a bore beyond the recess into which hose material may be extruded during assembly of the nipple to the socket.

It is another object to provide a nipple and socket type of reusable coupling in which the nipple has a threaded connection to the socket and wherein there is a bore adjacent the threaded connection for receiving displaced hose material without permitting the material to work itself into the interengaged threads.

Other objects will be apparent from the description and from the drawing in which.

Figure 1:
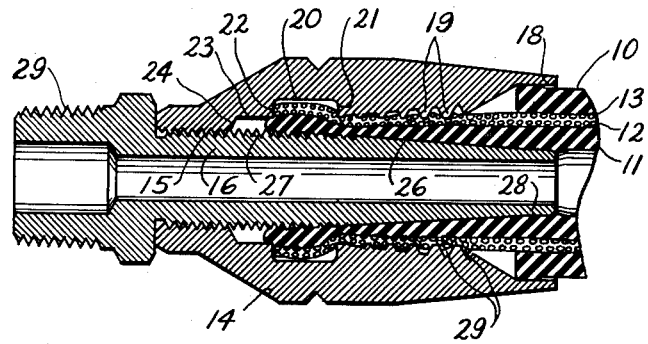
Figure 1 is a half sectional view of a coupling assembled upon a high pressure hose having a braided wire reinforcement between inner and outer layers of rubber but wherein the outer layer has been stripped off the part of the hose to be clamped.

As shown in the drawing, the high pressure hose 10 has an inner layer 11 of rubber, an intermediate braided wire reenforcement 12 and an outer layer 13 of rubber. A portion of the latter has been stripped off to expose the wire reenforcement along the part of the hose which enters the socket 14. The socket has an aperture 15 which is preferably threaded for interengaging a nipple 16. The socket has an outer wall 17 spaced from the nipple to form a hose receiving chamber therebetween. The wall has a short counterbore 18 at its outer end for receiving a small portion of the outer layer 13 of the hose. Inwardly of the counterbore is a clamping section having ribs 19, preferably in the form of spiral threads. Adjacent the ribbed clamping section is a recess 20 having transverse side walls 21 and 22. The spaces between the ribs are of progressively decreasing diameter, consequently the height of the ribs diminishes toward the recess 20. Preferably, the ribs will not quite disappear before the wall 21 is reached but their height will be diminished to such extent that it will be negligible. Thus the wall 21 is substantially uninterrupted by the spiral rib and will present an annular shoulder in one plane. If desired, the spiral rib may disappear completely just before it reaches the wall 21. A cylindrical bore 23 leads from the wall 22 to another transverse wall 24 which intersects the threaded aperture 15.

The nipple 16 has a tapered portion 26 adapted to lie opposite the clamping section of the socket and merging with a threaded section 27. If desired, the outer end of the nipple may have a cylindrical section 28. The other end of the nipple may have a thread 29′ or some other means of connecting the hose coupling to another part.

Figure 2:
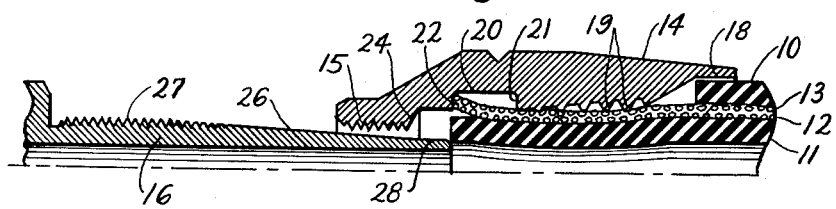
Figure 2 is a quarter sectional view similar to Figure 1 but showing the hose as initially inserted into the socket and with the nipple about to enter the hose.

Upon stripping the outer layer of rubber from the hose end, the wire braid unravels somewhat at the very end of the hose and the diameter of the braid at this point becomes somewhat enlarged as shown in Figure 2. By forming the spaces 29 between the holding ribs at the outer end of the socket to a relatively large diameter, entry of the hose into the socket is facilitated since the unravelled, enlarged wire braid will more readily enter the spaces 29 than if they were of a diameter smaller than the unravelled braid. The spaces 29 between the ribs 19 progressively decrease in diameter so that the height of the rib 19 in the vicinity of the recess wall 21 is negligible. As a result, the wall 21 is substantially uninterrupted and presents a full, annular surface across which the wire braid may be forced. Also, the shallowness of the spaces between the ribs at the inner end of the clamping section provides but little space into which the hose material can be displaced.

The hose end is inserted into the socket by threading since the ribs 19 are spiral. As the hose end passes under the spiral ribs it is decreased in diameter but expands in diameter when it passes into the recess 20. As the socket is turned farther onto the hose end, the wire braid strikes the stop shoulder 22, this indicating to the assembler that the socket is in the proper position on the hose.

The nipple is next inserted into the socket aperture 15, and as shown in Figure 2, the end of the nipple may readily enter the hose since the end of the hose has resumed its normal diameter upon entering the recess 20. As the nipple enters the hose it further expands the portion within the recess 20 and forces the wire braid against the annular shoulder 21. Since the latter is substantially uninterrupted a maximum gripping effect upon the braid will be obtained.

Upon threading all the way into the socket, as shown in Figure 1, the tapered portion 26 of the nipple will tightly force the hose end against the shoulder 21 and the clamping ribs 19. The greatest clamping force will be at the inward ribs since these are spaced the closest to the nipple. As the ribs are fairly shallow at this point there is but a small amount of displacement of the hose material into the spaces between the ribs. Thus practically all of the nipple travel is used to obtain actual compression force on the hose material in this region, very little of the travel is used in merely displacing hose material to fill up the spaces between the ribs.

As the nipple is threaded home, some of the rubber from the clamping area is displaced into the recess 20, causing the forward edge of the inner liner to enter the bore 23. Without the bore 22 this rubber would be extruded between the threads of the nipple and socket and would interfere with the disassembly of the parts.

Figure 3:
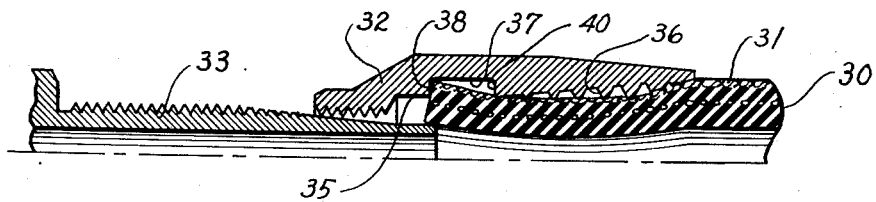
Figure 3 is a quarter sectional view of a socket as initially assembled upon an unstripped hose and with the nipple about to enter the hose.
Figure 4:
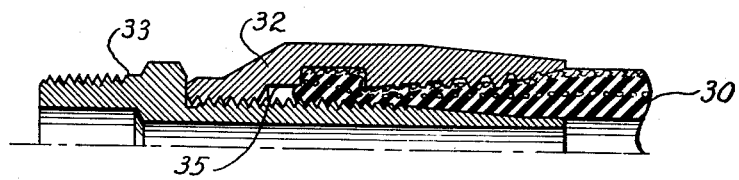
Figure 4 is a view like Figure 3 but showing the nipple fully assembled within the socket and unstripped hose.

The features of the present invention are of advantage when used in couplings for unstripped hose, as shown in Figures 3 and 4, as well as for stripped hose. In such case the unstripped hose 30 may or may not be provided with an outer braided covering 31 of cotton or other material. The coupling includes a socket 32 and a nipple 33. The diameter of the socket bore 35 is about the same as the small diameter of the ribs 36 and somewhat less than the normal outer diameter of the hose. Thus upon insertion into the socket the hose will be constricted somewhat under the ribs but the very end of the hose will resume its normal diameter as it enters the socket recess 37 and will thus abut the wall 38 to limit the distance the hose may enter the socket. Upon insertion of the nipple 33, the hose material will be forced tightly against the substantially uninterrupted shoulder 40 and the ribs 36 and because the ribs in the region of greatest compression are relatively shallow there will be a minimum of displacement of hose material into the spaces between the ribs before substantial support or resistance to compression is afforded by the socket. Also, hose material may enter the bore 35 without jamming into the engaging threads of the socket and nipple.

Although I have illustrated but one embodiment of the present invention (the forms for stripped and unstripped hose being similar except for dimensional proportioning) it is obvious that the invention may encompass other forms and still be within the scope of the invention as claimed herein.

I claim:

A reuseable coupling for attachment to the end of a flexible hose comprising a socket and a nipple, said socket having a bore therethrough and adjacent one end in said bore having a portion provided with screw-threads, said bore at the inner extremity of said screw-threads having an annular space of greater diameter than said portion, said bore at the inner extremity of said annular space having an annular recess of greater diameter than and in communication with said space, said bore having a relatively long generally tapered hose-receiving chamber whose smaller end leads from said recess, said socket having longitudinally spaced first and second walls located at the ends of the recess and perpendicular to the longitudinal axis of the socket and each terminating at its inner extremity the same distance outwardly of and with respect to said axis, said relatively long generally tapered wall of said hose-receiving chamber having a hose-engaging screw-thread tapered in the direction of and running out short of said second end wall, whereby at the juncture of said generally tapered wall with the second end wall an annular shoulder with an uninterrupted surface is provided, said socket being adapted with the larger end of said chamber foremost to be threaded onto the flexible hose to the extent limited by said first end wall whereby the coupled portion of the hose will be compressed and reduced in diameter in said chamber and will be expanded in said recess, said nipple having screw-threads in engagement with said first-mentioned screw-threads, and a tapered hose-expanding portion insertable into said bore and into the hose, said tapered hose-expanding portion being of a size to effect uniform gripping of the hose by said shoulder with said space accommodating any longitudinal expansive extension of the hose through the turning of the nipple during its attachment to the socket.

References Cited in the file of this patent

UNITED STATES PATENTS

| 2,262,228 | Garretson | Nov. 11, 1941 |
| 2,371,971 | Main | Mar. 20, 1945 |
| 2,441,718 | Parker | May 18, 1948 |
| 2,476,480 | Bruckle | July 19, 1949 |
| 2,485,975 | Main | Oct. 25, 1949 |
| 2,485,976 | Main | Oct. 25, 1949 |

FOREIGN PATENTS

| 142,172 | Great Britain | July 12, 1951 |